US012654399B2

(12) United States Patent
Arcidiacono et al.

(10) Patent No.: US 12,654,399 B2
(45) Date of Patent: Jun. 16, 2026

(54) ULTRASONIC WELDING OF PREPREG TAPE

(71) Applicant: Hexcel Composites Limited, Duxford (GB)

(72) Inventors: Marco Arcidiacono, Duxford (GB); Jorge Barrio, Duxford (GB); Hector Alvarez, Duxford (GB)

(73) Assignee: Hexcel Composites Limited, Duxford (GB)

( * ) Notice: Subject to any disclaimer, the term of this patent is extended or adjusted under 35 U.S.C. 154(b) by 0 days.

(21) Appl. No.: 19/128,125

(22) PCT Filed: Nov. 6, 2023

(86) PCT No.: PCT/GB2023/052889
§ 371 (c)(1),
(2) Date: May 7, 2025

(87) PCT Pub. No.: WO2024/100381
PCT Pub. Date: May 16, 2024

(65) Prior Publication Data
US 2026/0008236 A1      Jan. 8, 2026

(30) Foreign Application Priority Data

Nov. 7, 2022   (GB) ..................................... 2216511
Dec. 15, 2022   (GB) ..................................... 2218913

(51) Int. Cl.
*B29C 65/08*        (2006.01)
*B29C 65/00*        (2006.01)
(Continued)

(52) U.S. Cl.
CPC .......... *B29C 65/08* (2013.01); *B29C 66/0224* (2013.01); *B29C 66/1122* (2013.01);
(Continued)

(58) Field of Classification Search
None
See application file for complete search history.

(56) References Cited

U.S. PATENT DOCUMENTS 6,284,089 B1 *   9/2001   Anderson ........... B29C 66/8242
                                                      156/304.6
2011/0154779 A1   6/2011   Baba et al.
(Continued)

FOREIGN PATENT DOCUMENTS

EP           3 272 508 A1      1/2018
WO     WO 2017/220327 A1     12/2017
WO     WO 2018/088173 A1      5/2018

OTHER PUBLICATIONS

GB Application No. 2218913.8, Office Action mailed Apr. 4, 2024.
(Continued)

*Primary Examiner* — Barbara J Musser
(74) *Attorney, Agent, or Firm* — ALSTON & BIRD LLP

(57)                ABSTRACT
A process for forming a spliced prepreg tape by joining adjacent ends (22, 24) of a first and a second prepreg tape (2, 3, 4), each prepreg tape comprising a respective first and second prepreg layer (12, 18) comprising fibrous material and curable thermosetting resin, each prepreg tape further comprising a respective first and second releasable polymeric backing sheet (14), the process involving: peeling of the first polymeric backing sheet from the first prepreg layer, so as to provide a first peeled end region, and optionally peeling of the second polymeric backing sheet from the second prepreg layer, so as to provide a first peeled end region (30), and optionally a second peeled end region (32), over which peeled end region or regions the prepreg layer is separated from its respective polymeric backing sheet; overlapping the first and second prepreg tapes at the first peeled end region, and if present the second peeled end region, so as to form a preliminary spliced join (34, 38), the prelimi-
(Continued)

nary spliced join comprising first and second adjacent layers of prepreg and first and second adjacent layers of polymeric backing sheet; ultrasonically welding of the preliminary spliced join (36) to merge together the first and second adjacent layers of prepreg and to merge together the two adjacent layers of polymeric backing sheet to form the spliced prepreg tape.

16 Claims, 3 Drawing Sheets

(51) Int. Cl.
| | |
|---|---|
| *B29C 70/38* | (2006.01) |
| *B29K 23/00* | (2006.01) |
| *B29K 105/08* | (2006.01) |

(52) U.S. Cl.
CPC ........ *B29C 66/43* (2013.01); *B29C 66/72141* (2013.01); *B29C 70/386* (2013.01); *B29K* *2023/065* (2013.01); *B29K 2105/0881* (2013.01); *B29K 2995/0097* (2013.01)

(56) References Cited

U.S. PATENT DOCUMENTS

| | | | |
|---|---|---|---|
| 2017/0341315 A1 | 11/2017 | Amari et al. | |
| 2019/0210295 A1* | 7/2019 | Arcidiacono | .......... B29C 65/08 |
| 2021/0101314 A1 | 4/2021 | Henry et al. | |

OTHER PUBLICATIONS

GB Application No. 2218913.8, Search Report dated Apr. 3, 2024.
WIPO Application No. PCT/GB2023/052889, PCT International Search Report and Written Opinion of the International Searching Authority mailed Feb. 8, 2024.

\* cited by examiner (a)

(b)

ULTRASONIC WELDING OF PREPREG TAPE

CROSS REFERENCE TO RELATED APPLICATIONS

This application is a National Stage Application, filed under 35 U.S.C. § 371, of International Application No. PCT/GB2023/052889, filed Nov. 6, 2023, which claims priority to GB Application No. 2216511.2, filed Nov. 7, 2022, and GB Application No. 2218913.8, filed Dec. 15, 2022, the contents of each of which are hereby incorporated by reference in their entirety.

TECHNICAL FIELD

The present invention relates to a process for forming a spliced prepreg tape by joining adjacent ends of a first and second prepreg tape using ultrasonic welding, the spliced tape formed by the process, and a method of laying down the spliced prepreg in an automated tape laying process.

BACKGROUND

Composite materials have well-documented advantages over traditional construction materials, particularly in providing excellent mechanical properties at very low material densities. As a result, the use of such materials is widely used and their fields of application range from "industrial" and "sports and leisure" to high performance aerospace components.

Prepregs, comprising a fibre or fabric arrangement impregnated with thermosetting resin such as epoxy resin, are widely used in the generation of such composite materials. The resin may be combined with the fibres or fabric in various ways. The resin may be tacked to the surface of the fibrous material, however more usually it partially or completely impregnates the interstices between the fibres. Such prepregs may sometimes be referred to as semipregs or towpregs, depending on the degree of impregnation of resin, but are considered to fall within the more general term of prepreg in the context of the present invention.

Once manufactured, typically a number of plies of such prepregs are "laid-up" as desired and the resulting prepreg stack, i.e. a laminate or preform, is cured, typically by exposure to elevated temperatures, to produce a cured composite structure.

One common method of preparing such a laminated arrangement is to lay down the prepreg as a tape, in a so-called automatic fibre placement (AFP) or automatic tape laying (ATL) processes, which, in the context of the present invention may be considered synonymous and generally referred to as 'automated tape laying'. Generally these involve the automatic placement of prepreg in relatively narrow width tape form, from a long roll of prepreg. Widths of 3.2 mm, 6.35 mm, 12.7 mm and 25.4 mm are commonly used.

Such prepreg tapes are typically manufactured by slitting a wider master, or parent, roll of prepreg. Slitting involves cutting the master roll parallel to the length of the resulting tape, in order to produce the narrow width tapes. During or prior to the slitting process, such parent rolls of prepreg are sometimes joined together at their ends, or spliced, in order to produce longer rolls of slit prepreg tape. Additionally, if any defects in the parent roll are discovered during, after or prior to the slitting step, then the defective regions can be cut out, and the remaining prepreg surrounding the defective region spliced together. Conventionally, such defective regions are removed 'offline' on a so-called editing table.

Several methods of joining or splicing have been suggested, ranging from the simple application of pressure and heat, e.g. as disclosed in EP 3272508, the use of adhesives, and more recently the use of ultrasonic welding. Ultrasonic welding has significant advantages, as it has been shown to be able to produce spliced joins wherein the thickness of the join is essentially the same thickness as that of the individual tapes being joined.

WO 2017/220327 A1 discloses a process for forming a permanent spliced join between two prepregs by applying ultrasonic welding, wherein there is no significant change in the sub-ambient Tg of the fibrous material in the prepreg in the region of the permanent join.

However, such master rolls of prepreg often have a backing paper e.g. of siliconised paper, to aid their handling and to facilitate the rolling up of the tapes, so that they can be transported at a later point in time for slitting and removal of defects. As is well-known, the curable resins in the prepregs are generally very sticky, and so a backing paper is essential to be able to store the tapes in roll form. However, the presence of the backing paper complicates the splicing of two prepreg tapes and requires careful manual preparation prior to welding and is very labour intensive, particularly when done offline on an editing table. Even then, when the prepreg layer of such slit tapes are spliced together, the cut ends of the backing paper at the splice are typically simply bonded together, e.g. by use of an adhesive tape along the join, which can present a potential failure point during automated tape laying.

Further improvements in the formation of spliced tapes suitable for automatic tape laying would therefore be desirable.

SUMMARY OF INVENTION

In a first aspect, the invention relates to a process for forming a spliced prepreg tape by joining adjacent ends of a first and a second prepreg tape, each prepreg tape comprising a respective first and second prepreg layer comprising fibrous material and curable thermosetting resin, each prepreg tape further comprising a respective first and second releasable polymeric backing sheet, the process involving: peeling of the first polymeric backing sheet from the first prepreg layer, so as to provide a first peeled end region, and optionally peeling of the second polymeric backing sheet from the second prepreg layer, so as to provide a first peeled end region, and optionally a second peeled end region, over which peeled end region or regions the prepreg layer is separated from its respective polymeric backing sheet; overlapping the first and second prepreg tapes at the first peeled end region, and if present the second peeled end region, so as to form a preliminary spliced join, the preliminary spliced join comprising first and second adjacent layers of prepreg and first and second adjacent layers of polymeric backing sheet; ultrasonically welding the preliminary spliced join to merge together the first and second adjacent layers of prepreg and to merge together the two adjacent layers of polymeric backing sheet to form the spliced prepreg tape.

In a second aspect, the invention relates to spliced prepreg tape obtainable by the process described herein.

In a third aspect, the invention relates to a method of laying down a prepreg tape to form a composite material, wherein the prepreg tape comprises a prepreg layer and a polymeric backing sheet, the method involving removing the polymeric backing sheet and laying down the prepreg layer by means of an automated tape laying apparatus, wherein the prepreg tape is a spliced prepreg tape according to the second aspect of the invention.

By having a polymeric backing sheet that is simultaneously subjected to the ultrasonic welding step, it has been found that the two ends of two prepreg tapes can be spliced together in a single step, merging together the respective prepreg layers and simultaneously merging together the respective polymeric backing sheets. This is a more efficient procedure than separately welding the prepreg material and then separately joining the backing sheet. It also produces a backing sheet in the spliced region that can withstand a higher tensile force, providing a stronger spliced join and preventing material failure in use, especially during automatic tape laying. Surprisingly, it has been found that ultrasonic welding can achieve this simultaneous welding without any contamination of the polymeric backing sheet or any silicone release agent into the prepreg layer.

Although a wide variety of polymeric backing sheets may be employed in the present invention, a backing sheet comprising high density polyethylene (HDPE) is preferred. This material provides the tensile strength required for automated tape laying. However, the general teaching of the literature on ultrasonic welding is that HDPE has too high a degree of crystallinity to be able to be effectively ultrasonically welded. The present inventors have surprisingly found that backing sheets comprising HDPE can be ultrasonically welded together, according to the teaching of the present invention. Other polymeric materials may be employed, such as MDPE, polypropylene, PTFE, PLA. Blends of such materials and/or layers of combinations of such materials may also be preferred. For example, one preferred backing sheet comprises a core of HDPE with outer layers of MDPE.

The spliced prepreg tape will generally be such that it can withstand similar tensile forces as the prepreg tapes that have been spliced together to form said spliced tape, e.g. when used in an automated tape laying process. However, such spliced prepreg tapes generally fail primarily when they are curled into rolls of small radii. Such curvature will be encountered during an automated tape laying process, and so the spliced prepreg tape must be able to remain intact during such a flexural deformation.

Although the polymeric backing sheet and prepreg layers are welded simultaneously in the same single step, it has been found to be advantageous that the ultrasonic welding parameters are selected such that the welding has two sequential phases.

The first phase is wherein a portion of the energy from the ultrasonic welding is converted into heat within the preliminary spliced join, during which phase the temperature of any resin in the prepreg layers increases and its viscosity decreases. This is followed by a second phase wherein the temperature of the preliminary spliced join has become stable and a steady state has been reached, during which phase there is a controlled welding involving a flow of thermosetting resin and a welding of the polymeric backing sheet occurring simultaneously.

When this sequential application of ultrasonic energy is achieved in a single step, then a strong weld of the polymeric backing sheet can be obtained, even with HDPE, without any burns or holes being formed therein, without contamination between the polymeric backing sheet and the prepreg layer, as well as a strongly merged splice of the prepreg layers.

As is already known in the art, the high frequency vibration in the vertical direction of the sonotrode of an ultrasonic welding apparatus on the prepreg surface causes the thermosetting resin viscosity to reduce such that the two layers of prepreg can merge together. Simultaneously, thermal energy is imparted to the polymeric backing sheet.

However, care must be taken to ensure that the thermal energy provided to the thermosetting resin is done in a controlled manner, to avoid the formation of exothermic runaway increases in temperature. Such exotherms can result in burning of the polymeric backing sheet, resulting in a poor result. It has been found that such exotherms can be avoided if the force applied during the welding process is kept below a critical value.

As would be well-known to a person skilled in the art, there are various parameters in an ultrasonic welding process can be varied that have an influence on the power applied, e.g. amplitude, frequency, force and trigger force.

Suitable ranges for frequency may be in the range of from 15 to 70 kHz, preferably from 16 to 35 KHz. Suitable amplitudes may be in the range of from 3 to 50 μm, more preferably from 15 to 25 μm, most preferably from 20 to 25 μm. Suitable values of the force applied may vary from 50 to 2000 N, preferably from 200 to 1000 N, more preferably from 200 to 600 N (for a rectangular preliminary spliced join having dimensions of 5.08 cm×3 cm).

It has been found that the maximum power delivered is preferably in the range of from 500 to 900 W (for a rectangular preliminary spliced join having dimensions of 5.08 cm×3 cm), as this gives a good balance between forming a good degree of merging of the adjacent prepreg layers and of the adjacent polymeric layers and not causing polymeric material to transfer to the prepreg layer whilst ensuring that the polymeric backing sheet welds over the full extent of the welding area. Thus, welding times of from 1.0 to 4.0 seconds are appropriate, preferably from 1.5 to 3.0 seconds.

It may be advantageous to position one or two layers of non-stick material between the preliminary spliced join and the sonotrode, in order to prevent the preliminary spliced join from sticking to any portion of the sonotrode. Suitable materials include any materials having non-stick properties, and preferably are non-compressible, such as PTFE coated materials. Examples include Teflon™ (e.g. Tygavac), PTFE coated glass cloth (e.g. standard grade 7058 Tygadur available from Taconic Wildcat, UK), and silicone coated materials, such as silicone coated paper (e.g. Mondi 120 g GL silicone release coated paper and Laufenberg NSS900 silicone coated paper).

Preferably the thickness of the spliced join is from 50 to 95% of the thickness of the preliminary spliced join, preferably from 70 to 90%. This results in the spliced prepreg tape having a lower thickness than that of the two prepreg tapes that have been spliced together. This therefore reduces the impact of the splice on the mechanical performance and dimensional tolerances of cured composite parts formed by an automated tape laying apparatus.

The length of the preliminary spliced join will have a significant effect on the strength of the spliced join formed following ultrasonic welding. Preferred lengths of the preliminary spliced join are therefore from 3 to 200 mm, more preferably from 10 to 150 mm, and most preferably from 15 to 75 mm.

In general the entirety of the preliminary spliced join will be subjected to ultrasonic welding, in order to achieve a more complete welding of the adjacent layers of prepreg and polymeric backing sheet. However, a neater and more effective splice may be obtainable when the prepreg tape to either side of the preliminary spliced join is also subjected to ultrasonic welding. Thus, from 1 to 50 mm of the prepreg tape to either side of the preliminary spliced join may be subjected to ultrasonic welding, i.e. the welding tool is wider than the overlapped material.

Preferably, the first and second prepreg tapes have the same width, as this results in a spliced prepreg tape of constant width, and therefore convenient to use in an automated tape laying apparatus.

Preferably the first and second prepregs tapes have the same thickness. This is usually the case, as they are typically prepared by the same process, or have resulted from a cut to remove a defect area. However the present invention applies equally to joining prepreg tapes of different thicknesses.

Preferably the width of the first and second prepreg tapes is less than 30 cm, preferably less than 20 cm, more preferably less than 10 cm. At such narrow widths, the resulting spliced prepreg tape can be used in an automated tape layup apparatus without the need for slitting along the length. Additionally, at these widths, prepreg material, such as resin or fibrous material, in the preliminary spliced join, can be permitted to spread laterally to create an overwidth extending beyond the backing sheet. Thus, preferably the ultrasonic welding step is followed by a step of cutting away the overwidth after forming the spliced join.

Therefore no elaborate designs of overlaps of the prepreg tapes to be joined is necessary, and a simple cut along the width is all that is needed. Preferably, any resin or fibrous material that flows to the sides is removed by cutting after formation of the spliced join.

As already discussed, the prepreg tapes that are spliced together are either two ends of existing tape, or two freshly cut ends of a single tape, where a defect in the tape has been removed. Thus, being able to produce spliced prepreg tape merely with straight cut ends is particularly advantageous, as it makes an automation of the splicing procedure vastly more simple to implement.

Thus, one significant advantage of the present invention is that it lends itself to automation, because it does not require separate treatment of the backing sheet. Thus, preferably the steps of peeling, overlapping and ultrasonically welding are carried out automatically without the need for manual intervention.

Preferably the automation involves the use of suction applied to the prepreg tape to induce the peeling, and preferably also the overlapping.

One preferred way in which the first and second prepreg tapes are overlapped is that only the first backing sheet is peeled away to form a first peeled end region, into which peeled end region is inserted the end of the second prepreg tape, such that the preliminary spliced join comprises: the first polymeric backing sheet, which is adjacent to the second polymeric backing sheet, which is adjacent to the second prepreg layer, which is adjacent to the first prepreg layer.

An alternative preferred way in which the first and second prepreg tapes are overlapped is that both the first backing sheet and the second backing sheet are peeled away to form a first peeled end region and a second peeled end region, the first peeled end region and second peeled end region being mutually inserted into each other, such that the preliminary spliced join comprises: the first polymeric backing sheet, which is adjacent to the second polymeric backing sheet, which is adjacent to the first prepreg layer, which is adjacent to the second prepreg layer.

The ultrasonic welding may be carried out by any suitable equipment, however preferably ultrasonic welding is carried out by contacting the preliminary spliced join with a sonotrode while it is supported by an anvil. The anvil may be in the form of a generally flat plate, a drum or roller.

Commercially available sonotrodes are available that have a generally rectangular contact surface, and should be selected to provide a surface that at least completely covers the area of the preliminary spliced join. The contact surface may be flat or undulating, e.g. having a dimpled pattern, which can provide a stronger mechanical lock between the tapes.

The thermosetting resin in the spliced prepreg tape is essentially chemically unchanged with respect to the thermosetting resin in the remainder of the prepreg tape that was not involved in the ultrasonic welding process.

The thermosetting resin may be selected from those conventionally known in the art, such as resins of phenol formaldehyde, urea-formaldehyde, 1, 3, 5-triazine-2, 4, 6-triamine (Melamine), Bismalemide, epoxy resins, vinyl ester resins, Benzoxazine resins, polyesters, unsaturated polyesters, Cyanate ester resins, or mixtures thereof. Epoxy resins are particularly preferred. Curing agents and optionally accelerators may be included as desired.

The thermosetting resins are preferably epoxy resins. The epoxy resin used in resin composition of the invention and/or in the preparation of the prepreg preferably has an Epoxy Equivalent weight (EEW) in the range from 10 to 1500, preferably it has an EEW in the range of from 50 to 500. Suitable epoxy resins may comprise blends of two or more epoxy resins selected from monofunctional, difunctional, trifunctional and/or tetrafunctional epoxy resins.

Suitable difunctional epoxy resins, include those based on: diglycidyl ether of bisphenol F (bisphenol F epoxy resin), e.g. Araldite GY281 and GY285 (Huntsman Advanced Materials), diglycidyl ether of bisphenol A (bisphenol A epoxy resin), e.g. Epon 825 (DER 332-Dow Chemical, Midland, MI), phenol and cresol epoxy novolacs, glycidyl ethers of phenol-aldehyde adducts, glycidyl ethers of aliphatic diols, diglycidyl ether, diethylene glycol diglycidyl ether, aromatic epoxy resins, aliphatic polyglycidyl ethers, epoxidized olefins, brominated resins, aromatic glycidyl amines, heterocyclic glycidyl imidines and amides, glycidyl ethers, fluorinated epoxy resins, glycidyl esters or any combination thereof. Suitable difunctional epoxy resins include GY 281 (also known as LY3581). A difunctional epoxy resin may be used alone or in any suitable combination with other difunctional epoxies Difunctional epoxy resins may be selected from diglycidyl ether of bisphenol F, diglycidyl ether of bisphenol A, diglycidyl dihydroxy naphthalene, or any combination thereof.

Suitable trifunctional epoxy resins, may include those based upon phenol and cresol epoxy novolacs, glycidyl ethers of phenol-aldehyde adducts, aromatic epoxy resins, aliphatic triglycidyl ethers, dialiphatic triglycidyl ethers, aliphatic polyglycidyl ethers, aliphatic polyglycidyl amines, heterocyclic glycidyl imidines and amides, glycidyl ethers, epoxidised olefins; brominated resins, aromatic glycidyl amines; fluorinated epoxy resins or any combination thereof. Suitable trifunctional epoxy resins are available from Huntsman Advanced Materials (Monthey, Switzerland) under the trade names MY0500 and MY0510 (triglycidyl para-aminophenol) and MY0600 and MY0610 (triglycidyl meta-aminophenol). Triglycidyl meta-aminophenol is also available from Sumitomo Chemical Co. (Osaka, Japan) under the trade name ELM-120.

Tetrafunctional epoxy resins are also preferred. It is envisaged that the phenyl ring may additionally be substituted with other suitable non-epoxy substituent groups.

Suitable substituent groups, by way of example, include hydrogen, hydroxyl, alkyl, alkenyl, alkynyl, alkoxyl, aryl, aryloxyl, aralkyloxyl, aralkyl, halo, nitro, or cyano radicals. Suitable non-epoxy substituent groups may be bonded to the phenyl ring at the para or ortho positions, or bonded at a meta position not occupied by an epoxy group.

Suitable tetrafunctional epoxy resins include N,N,N',N'-tetraglycidyl-m-xylenediamine (available commercially from Mitsubishi Gas Chemical Company (Chiyoda-Ku, Tokyo, Japan) under the name Tetrad-X), and Erisys GA-240 (from CVC Chemicals, Morrestown, N.J.) and N, N,N',N'-tetraglycidylmethylenedianiline (e.g. MY720 and MY0721 from Huntsman Advanced Materials). Other suitable multifunctional epoxy resins include DEN438 (from Dow Chemicals, Midland, MI), DEN439 (from Dow Chemicals), Araldite ECN 1273 (from Huntsman Advanced Materials), MY722 (from Huntsman Advanced Materials), and Araldite ECN 1299 (from Huntsman Advanced Materials).

It is preferred that at least one of the multifunctional epoxies has at least one meta-substituted phenyl ring in its backbone. Preferred multifunctional epoxy resins are those that are trifunctional or tetrafunctional. Most preferably, the multifunctional epoxy resin will be a combination of tri-functional and multifunctional epoxies. The multifunctional epoxy resins may be saturated, unsaturated, cylcoaliphatic, alicyclic or heterocyclic.

The resin systems may comprise a thermoplastic material which is soluble in the epoxy resin such as polyethersul-phone, to improve the toughness of the resin. Exemplary thermoplastic toughening agents/particles include any of the following thermoplastics, either alone or in combination: polyamides, copolyamides, polyimides, aramids, polyke-tones, polyetheretherketones, polyesters, polyurethanes, polysulphones, polyethersulfones, high performance hydro-carbon polymers, liquid crystal polymers, PTFE, elastomers, and segmented elastomers.

The resin also suitably comprises curing agents and curing agent accelerators. Cure accelerators are usually heat activated and shorten the time taken to cure the resin. Suitable curing agents are the amines, including aromatic amines, e.g., 1,3-diaminobenzene, 1,4-diaminobenzene, 4,4'-diamino-diphenylmethane, and the polyaminosul-phones, such as 4,4'-diaminodiphenyl sulphone (4,4'-DDS—available from Huntsman), 4-aminophenyl sulphone, and 3,3'-diaminodiphenyl sulphone (3,3'-DDS).

The present invention applies to a wide range of prepreg tapes, and includes tapes where the structural fibres have an areal weight of from 10 to 1200 g/m². However, preferably they have an areal weight of from 100 to 800 g/m², more preferably from 200 to 600 g/m².

Typically, the fibres in the structural layer will generally have a circular or almost circular cross-section with a diameter in the range of from 3 to 20 μm, preferably from 5 to 12 μm.

The prepreg is typically produced as a continuous web of material, as discussed below, having a length greater than its width, typically much greater. Such prepregs are generally produced as a prepreg roll, the length of which is given by the width of the prepreg. In view of the tacky nature of the prepreg, the polymeric backing sheet is provided to enable the prepreg roll to be unfurled at the point of use.

The fibres may be in the form of a fabric or be formed from tows of discrete fibres. However, the present invention is more usefully applied when the fibres are discrete and not interwoven, and preferably the fibres are unidirectional, in that they are arranged parallel to each other, and in general will be parallel to the length of the prepreg. Unidirectional fibres are capable of splicing together more easily. The fibres may comprise cracked (i.e. stretch-broken), selectively dis-continuous or continuous fibres.

Exemplary layers of unidirectional fibres are made from HexTow™ carbon fibres, which are available from Hexcel Corporation. Suitable HexTow™ carbon fibres for use in making many unidirectional fibre layers include: IM5 car-bon fibres, which are available as 6,000, 12,000 and 24,000 filaments; IM7 carbon fibres, which are available as fibres that contain 6,000 or 12,000 filaments and weigh 0.223 g/m and 0.446 g/m respectively; IM8-IM10 carbon fibres, which are available as fibres that contain 12,000 filaments and weigh from 0.446 g/m to 0.324 g/m; and AS7 carbon fibres, which are available in fibres that contain 12,000 and 24,000 filaments and weigh 0.800 g/m and 1.600 g/m respectively. The tows typically have a width of from 3 to 7 mm and are fed for impregnation on equipment employing combs to hold the tows and keep them parallel and unidirectional, as discussed below.

The fibres may be selected from the list consisting of carbon fibres, glass fibres, graphite fibres, metallised poly-mers and mixtures thereof.

On a weight basis, typically the prepregs comprise from 15 to 70 wt % of curable resin, preferably from 20 to 65 wt %, more preferably from 25 to 50 wt % and most preferably from 25 to 40 wt %. On a volume basis, typically the prepregs comprise from 15 to 70 vol % of curable resin, preferably from 20 to 60 vol %, more preferably from 30 to 50 vol % of the curable resin.

On a volume basis, typically the prepregs comprise from 45 to 75 vol % of structural fibres, preferably from 55 to 70 vol %.

Resin and fibre content of uncured prepregs which contain unidirectional carbon fibres are determined in accordance with DIN EN 2559 A (code A). Resin and fibre content of cured composites which contain carbon fibrous material are determined in accordance with DIN EN 2564 A.

The prepreg tapes according to the invention may be manufactured in known manner, e.g. by the process described and illustrated in WO2010/150022, typically in a continuous process involving the passage of many thou-sands of fibres, forming a structural layer of fibres, through a series of impregnation stages, typically guided by rollers, which act to impregnate resin into the structural layer.

Before the fibres are contacted with the resin and reach the impregnation zone they are typically arranged in a plurality of tows of fibres, each tow comprising many thousands of filaments, e.g. 12,000. These tows are mounted on bobbins and are fed initially to a combing unit to ensure even separation of the fibres. The structural layer is typically formed from a plurality of tows of fibres, which are spread out to merge together over spreader bars, prior to impreg-nation with the resin.

In order to improve handling of the resin it is conventional that it is supported onto a backing material, such as paper. The resin is then fed, typically from a roll, such that it comes into contact with the fibres, the backing material remaining in place on the exterior of the resin and fibre contact region. During the subsequent impregnation process the backing material provides a useful exterior material to apply pressure to, in order to achieve even impregnation of resin.

During this process of impregnation, resin passes between the interstices of the fibres. To facilitate impregnation of the resin into the fibres it is conventional for this to be carried out at an elevated temperature, e.g. from 60 to 170° C. preferably from 100 to 140° C., so that the resin viscosity reduces, i.e. to from 0.1 Pas to 100 Pas, preferably from 6 to 100 Pas, more preferably from 18 to 80 Pas, and even more preferably from 20 to 50 Pas. This is most conveniently achieved by heating the resin and fibres, before impregnation, to the desired temperature, e.g. by passing them through an infra-red heater.

Following impregnation there is typically a cooling step, to reduce the tackiness of the formed prepreg. This may be followed by further treatment stages such as laminating, slitting and separating. Once prepared the prepreg tape may be rolled-up so that it can be stored for a period of time.

When it is desired to manufacture a composite material, a number of such prepregs are typically stacked together, producing a prepreg stack or preform.

The prepreg tapes can be prepared as a roll of material prepared specifically for an automatic tape laying apparatus. Thus, the prepreg tape provided with a polymeric backing sheet is preferably sufficiently flexible so as to be able to form a roll with a diameter of less than 20 cm, preferably less than 10 cm. Known automatic tape laying apparatus requires the roll to satisfy particular dimensions. For example, the roll is either wound onto a 254 mm or 295 mm inside diameter core with a tolerance of ±0.5 mm. The roll can be cut to standard prepreg tape widths which include 600 mm (24"), 300 mm (12"), 150 mm (6"), 75 mm (3"), 50 mm (2"), 25 mm (1"), 6.34 mm (¼") and 3.18 mm (⅛") in width, and cut within a tolerance of ±0.050 mm and then laid-up as several layers of tape and cured. Tapes are frequently used in this way in the production of aircraft components.

However, preferably, the prepreg tapes according to the present invention are manufactured to be already at the width required of an automatic laying apparatus, so that there is no need for cutting or slitting a master prepreg as a separate step. This enables the automation of the splicing procedure according to the present invention to be carried out "on line", i.e. as part of the prepreg manufacturing process.

The prepreg tape so produced may be passed to an editing table, where defects can be cut from the tape by making cuts on either side along the width of the tape, and the ends then spliced together as discussed above.

A stack of prepreg tape so formed by tape lay-up is typically subsequently cured by exposure to elevated temperature, wherein the thermosetting resin cures to provide the resulting cured composite material. The cure cycles employed for curing prepregs and stacks of prepregs are a balance of temperature and time, taking account the reactivity of the resin and the amount of resin and fibre employed. This may be carried out under elevated pressure in known manner, such as the autoclave techniques. Alternatively or additionally, curing may be carried out close to atmospheric pressure, in the so-called vacuum bag technique.

As will be known to a person skilled in the art, such curing processes are generally exothermic, and so care must be taken to prevent excessive temperatures, which can damage any moulds or cause decomposition of the resin.

Typically, the cured resin has a glass transition temperature of from 150° C. to 200° C., more preferably from 160° C. to 200° C.

Once cured, the prepreg or prepreg stack becomes a composite material, suitable for use in a structural application, for example an aerospace structure.

The invention will now be illustrated, by way of example, and with reference to the following figures, in which.

Figure 3:
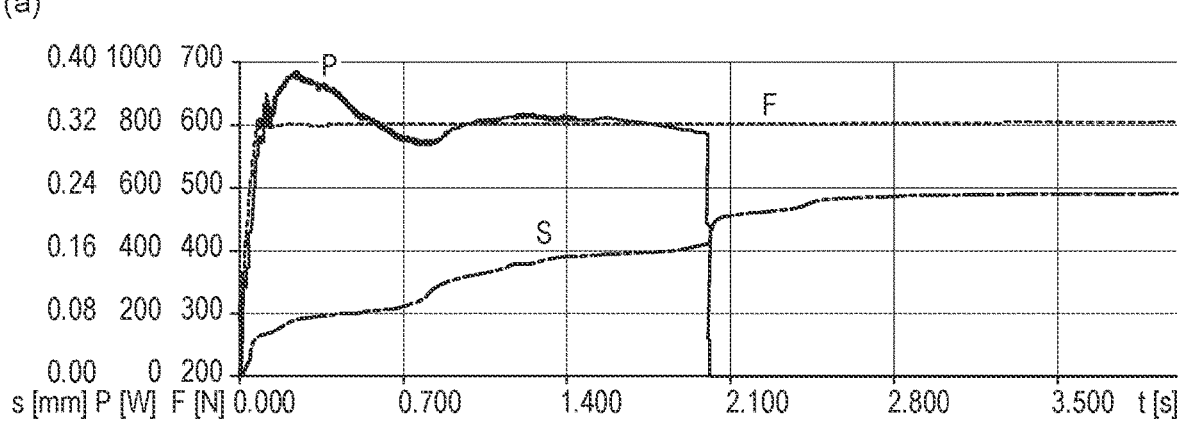
Figure 3:
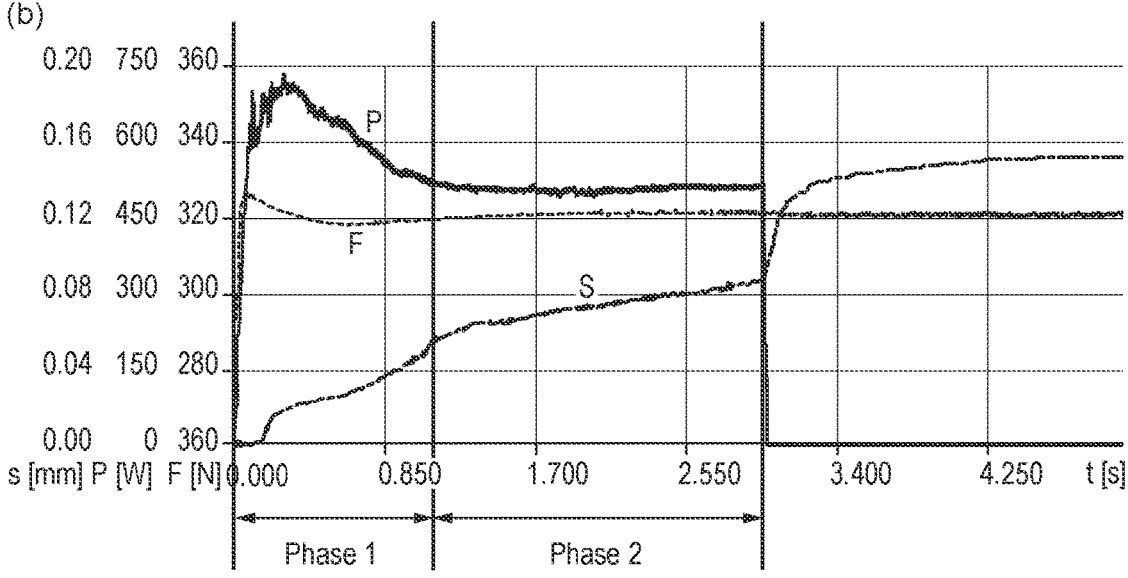

FIGS. 3a and 3b are charts showing the evolution of the compression of the preliminary spliced join, the power applied and the force applied, during ultrasonic welding in examples 20 and 31 respectively.

Figure 1:
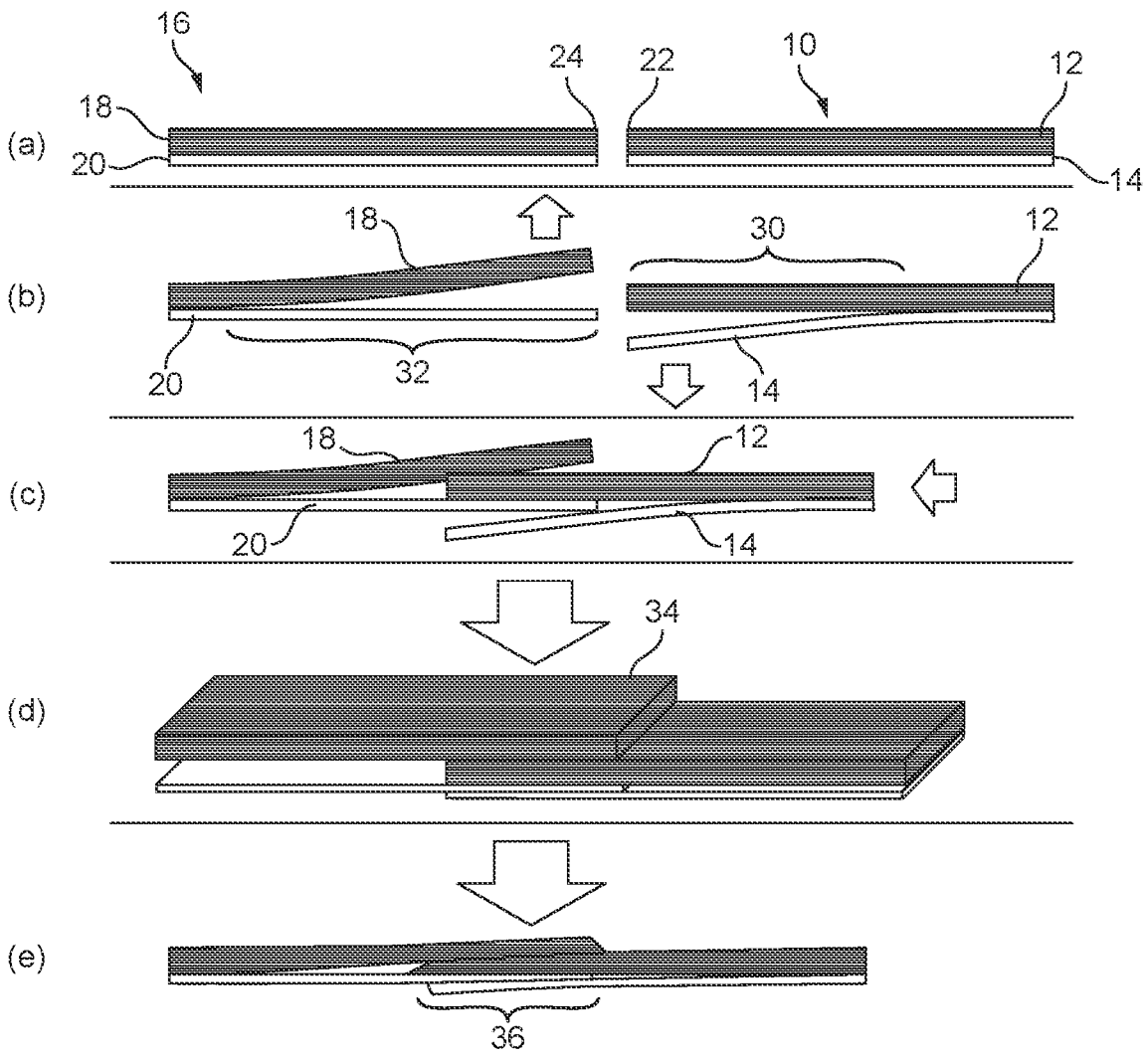
FIG. 1 is a schematic representation of a process of forming a spliced join according to the present invention.

Turning to the figures, FIG. 1 is a schematic representation of the various steps in a process for forming a spliced join according to the present invention, proceeding from the top to the bottom. In the initial state shown in step (a) there is shown, in side view, a first prepreg tape 10 comprising a first prepreg layer 12 and a first releasable polymeric backing sheet 14, and a second prepreg tape 16 comprising a second prepreg layer 18 and a second releasable polymeric backing sheet 20. The first prepreg tape 10 also has an end 22, and the second prepreg tape 16 has an end 24, and the two ends 22, 24 are adjacent to each other, and will be spliced together in later steps of the process. The two tapes 10, 16 continue to extend along their length out of the image of the figure, but are shown truncated for ease of illustration.

As shown in step (b) of FIG. 1, the first polymeric backing sheet 14 is peeled from the first prepreg layer 12 by peeling the end 22 downwards in the direction of the arrow, so as to provide a first peeled end region 30. Simultaneously, the second polymeric backing sheet 20 is peeled from the second prepreg layer 18 by peeling the end 24 upwards in the direction of the arrow, so as to provide a second peeled end region 32. As may be appreciated, such a peeling step can be carried out automatically, such as by use of suction.

As shown in step (c) of FIG. 1, the first prepreg tape 10 and second prepreg tape 16 are overlapped at the first peeled end region 30, and the second peeled end region 32. Specifically, the first peeled end region 30 and second peeled end region 32 have been mutually inserted into each other. As shown at step (d) a preliminary spliced join 34 is formed that comprises: the first polymeric backing sheet 14, which is adjacent to the second polymeric backing sheet 20, which is adjacent to the first prepreg layer 12, which is adjacent to the second prepreg layer 18.

Finally, the preliminary spliced join 34 is ultrasonically welded, to produce the spliced join 36 shown in step (e).

Figure 2:
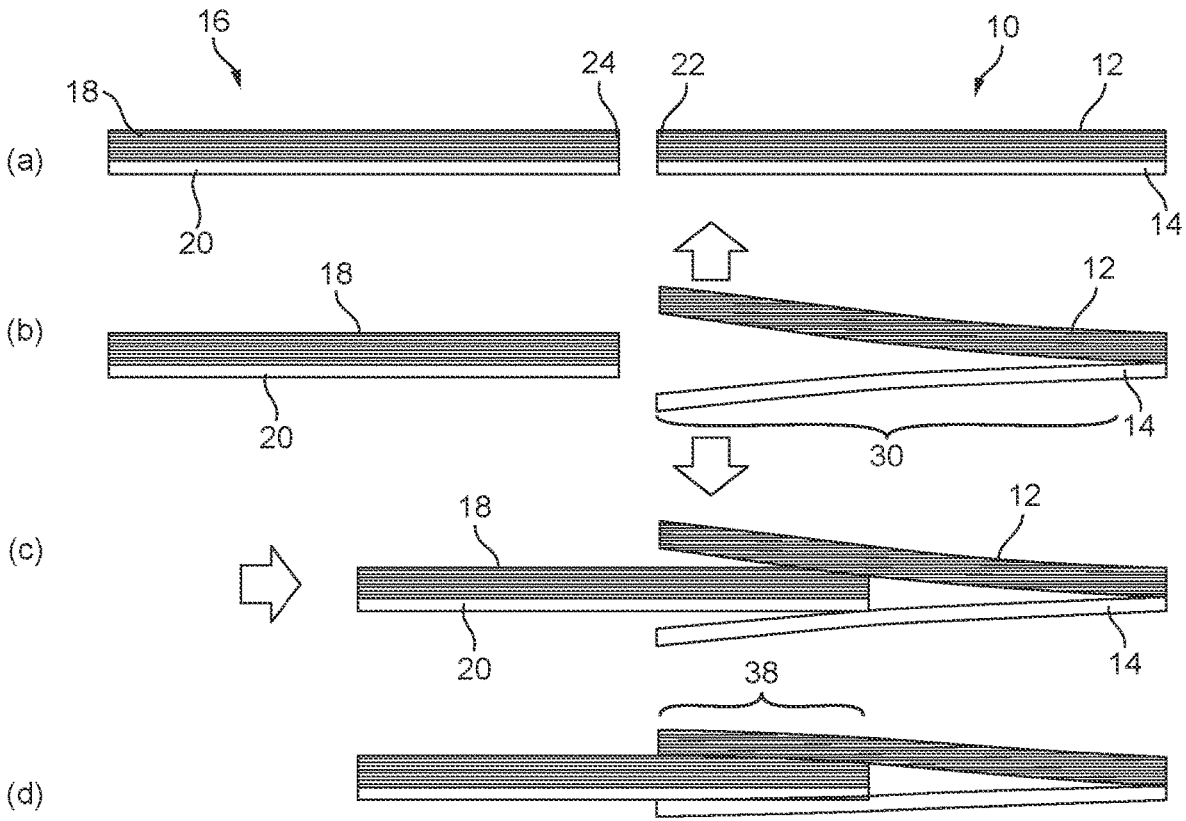
FIG. 2 is a schematic representation of a further process of forming a spliced join according to the present invention.

FIG. 2 is a schematic representation of the various steps in a further process for forming a spliced join according to the present invention, proceeding from the top to the bottom. In the initial state shown in step (a) there is shown, in side view, a first prepreg tape 10 comprising a first prepreg layer 12 and a first releasable polymeric backing sheet 14, and a second prepreg tape 16 comprising a second prepreg layer 18 and a second releasable polymeric backing sheet 20. The first prepreg tape 10 also has an end 22, and the second prepreg tape 16 has an end 24, and the two ends 22, 24 are adjacent to each other, and will be spliced together in later steps of the process. The two tapes 10, 16 continue to extend along their length out of the image of the figure, but are shown truncated for ease of illustration.

As shown in step (b) of FIG. 2, the first polymeric backing sheet 14 is peeled from the first prepreg layer 12 by peeling the backing sheet 14 downwards in the direction of the arrow, whilst also peeling the prepreg layer 12 upwards in the direction of the arrow, so as to provide a first peeled end region 30.

As shown in step (c) of FIG. 2, the first prepreg tape 10 and second prepreg tape 16 are overlapped at the first peeled end region 30, and the second peeled end region 32. Specifically, the end 24 of the second prepreg tape 16 is inserted into the first peeled end region 30. As shown in step (d) a preliminary spliced join 38 is formed that comprises: the first polymeric backing sheet 14, which is adjacent to the second polymeric backing sheet 20, which is adjacent to the second prepreg layer 18, which is adjacent to the first prepreg layer 12.

EXAMPLES

Two prepreg tapes comprising resin system M21EV at 34% by weight, with 268 gsm 12 k unidirectional carbon fibres (Intermediate Modulus Type A) with a width of 2" (5.08 mm), (the individual components being available from Hexcel Composites Limited, United Kingdom) each of which had a backing sheet (comprising 60 wt % HDPE in total of three layers sandwiched within 40 wt % MDPE made up of two outer layers, providing a total thickness of 40 µm, available from Plasthill, The Netherlands) were brought together to form a preliminary spliced join, in the manner shown in FIG. 2. The tapes were overlapped by 3 cm and each tape had a flat end. Each tape had a thickness of approximately 270 µm, and therefore the preliminary spliced join had an initial thickness of approximately 540 µm.

The preliminary spliced join was placed on an anvil of a Hermann Ultraschalltechnik GmbH HiQ Vario benchtop ultrasonic welding machine with a maximum nominal power of 4800 W. The dimension of the sonotrode was 5 cm in the splice length direction and 21.5 cm in the splice width direction, and so was larger than the size of the preliminary subsequently applied, wherein the sonotrode remains in contact with the formed join after ultrasonic vibration has ceased. The force applied during this dwell time is at the nominal value set earlier during the formation period. The thickness of the spliced join was also measured after the completion of the ultrasonic welding.

Poly Weld Strength (PWS) was assessed, and scored 1 (no strength), 5 (low strength where the poly splice can be separated without stretching the poly), or 10 (high strength poly splice that cannot be separated without stretching and eventually destroying the splice).

Poly Weld Area (PWA) was assessed by visual inspection to assess the percentage area of the spliced join that has been welded.

Poly Transfer (PT) was assessed, and scored 1 (several large burnt pieces of poly stuck to the tape), 2 (several large partially burnt pieces of poly stuck to the tape), 3 (small slightly burnt piece of poly stuck to the tape), 4 (large piece corresponding to poly holes transferred), 5 (narrow pieces corresponding to poly holes partially transferred), 6 (narrow piece corresponding to poly hole partially transferred, 9 (negligible) and 10 (no visible evidence of poly transfer).

An overall Poly Score was also established based on the parameters (Poly Weld Area×0.5)+(Poly Weld Strength×5)+ Poly Transfer×20). A higher score meaning a superior weld.

The results are shown in table 1 below.

TABLE 1

| Example | Amplitude (µm) | Force (N) | Energy (J) | Time taken (s) | Peak Power (W) | PWA | PWS | PT | Poly score |
|---|---|---|---|---|---|---|---|---|---|
| 1 | 16.3 | 1300 | 3200 | 2.352 | 1596 | 25% | 5 | 10 | 238 |
| 2 | 16.3 | 1300 | 3800 | 2.774 | 1611 | 65% | 10 | 9 | 263 |
| 3 | 16.3 | 1500 | 3200 | 2.014 | 1881 | 70% | 10 | 3 | 145 |
| 4 | 16.3 | 1500 | 3800 | 2.465 | 1898 | 85% | 10 | 1 | 113 |
| 5 | 14.0 | 1300 | 3200 | 2.578 | 1421 | 60% | 10 | 5 | 180 |
| 6 | 14.0 | 1300 | 3800 | 3.030 | 1476 | 65% | 10 | 5 | 183 |
| 7 | 14.0 | 1500 | 3200 | 2.114 | 1836 | 55% | 10 | 6 | 198 |
| 8 | 14.0 | 1500 | 3800 | 2.552 | 1850 | 85% | 10 | 5 | 193 | spliced join. The supply voltage was set to 400V and the vibration frequency set to 20,000 Hz. The amplitude of vibration (at 60% setting) was set to 14 µm, which provides a linear vibration velocity of 0.88 m/s.

The force applied, the amplitude, and total energy delivered were varied in a systematic manner, according to a design-of-experiments pattern. Ultrasonic welding was then carried out to form a spliced join. Ultrasonic welding was continued until a specified end point was reached e.g. total energy delivered to the join, which defines the time taken to form the splice. An additional 2.0 second hold time was then It can be seen that the results vary significantly across the parametric space, and that there is no effect of total energy imparted. For practical purposes, only examples 1 and 2 would meet an acceptable minimum level of quality control, and it is noted that these were achieved at the highest amplitude and lowest force settings in this initial set of examples.

To investigate this further, a second set of experiments were carried out on the same arrangement of prepreg and HDPE backing sheet, however this time the amplitude was kept at 16.3 µm while the force was gradually reduced from 1300N to 800N. The results are shown below in table 2.

TABLE 2

| Ex | Amplitude (µm) | Force (N) | Energy (J) | Time taken (s) | Peak Power (W) | Thickness (mm) | PWA | PWS | PT | Poly score |
|---|---|---|---|---|---|---|---|---|---|---|
| 9 | 16.3 | 1300 | 2368 | 2.0 | 1387 | 0.475 | 90% | 10 | 1 | 115 |
| 10 | 16.3 | 1100 | 1972 | 2.0 | 1218 | 0.505 | 80% | 10 | 2 | 130 |
| 11 | 16.3 | 900 | 1637 | 2.0 | 1203 | 0.520 | 80% | 10 | 6 | 210 |
| 12 | 16.3 | 800 | 1410 | 2.0 | 1257 | 0.525 | 55% | 10 | 9 | 258 |
| 13 | 16.3 | 800 | 1417 | 2.0 | 1058 | 0.515 | 70% | 10 | 9 | 265 |
| 14 | 16.3 | 800 | 1442 | 2.0 | 1169 | 0.515 | 60% | 10 | 6 | 200 |
| 15 | 16.3 | 800 | 1463 | 2.0 | 1076 | 0.525 | 70% | 10 | 10 | 285 |

It can be clearly seen that there is a gradual improvement in poly score as the force is reduced. The good results achieved at 800N were therefore repeated, to check for consistency of results. At these values the consistency is also reasonably good, but could be improved.

To investigate this further, a third set of experiments were carried out on the same arrangement of prepreg and HDPE backing sheet, however this time the amplitude was kept at 17.3 µm while the force was gradually reduced from 1000N to 600N. The results are shown below in table 3.

TABLE 3

| Ex | Amplitude (µm) | Force (N) | Energy (J) | Time taken (s) | Peak Power (W) | Thickness (mm) | PWA | PWS | PT | Poly score |
|---|---|---|---|---|---|---|---|---|---|---|
| 16 | 17.3 | 1000 | 1943 | 2.0 | 1063 | 0.495 | 90% | 10 | 1 | 115 |
| 17 | 17.3 | 800 | 1562 | 2.0 | 914 | 0.515 | 60% | 10 | 4 | 160 |
| 18 | 17.3 | 700 | 1303 | 2.0 | 866 | 0.515 | 40% | 10 | 10 | 270 |
| 19 | 17.3 | 600 | 1167 | 2.0 | 820 | 0.51 | 20% | 5 | 10 | 235 |

These results further demonstrate the improved results achieved from reducing the force applied.

To investigate this further, a fourth set of experiments were carried out on the same arrangement of prepreg and HDPE backing sheet, however this time the amplitude was kept at 21.6 µm while the force was gradually reduced from 600N to 400N. The results are shown below in table 4.

TABLE 4

| Ex | Amplitude (µm) | Force (N) | Energy (J) | Time taken (s) | Peak Power (W) | Thickness (mm) | PWA | PWS | PT | Poly score |
|---|---|---|---|---|---|---|---|---|---|---|
| 20 | 21.6 | 600 | 1606 | 2.0 | 969 | 0.485 | 80% | 10 | 2 | 130 |
| 21 | 21.6 | 500 | 1397 | 2.0 | 908 | 0.480 | 85% | 10 | 9 | 273 |
| 22 | 21.6 | 450 | 1347 | 2.0 | 891 | 0.475 | 95% | 10 | 10 | 298 |
| 23 | 21.6 | 400 | 1213 | 2.0 | 796 | 0.485 | 95% | 10 | 10 | 298 |

Since the maximum score for the poly score is 300, examples 22 and 23 are practically the best results achievable.

It was suspected that the reason that example 20 did not produce a successful weld was because of the formation of an exotherm in the thermosetting resin. The details of this example are shown in FIG. 3a. It can be clearly seen that there is a jump up in applied power part way through, which is understood to be as a result of a runaway increase in temperature of the thermosetting resin, giving an uncontrolled reduction in viscosity instead of a smooth gradual reduction.

To further investigate if this combination of amplitude and force was robust, an additional fifth set of experiments were carried out on the same arrangement of prepreg and HDPE backing sheet, however this time the amplitude was kept at 21.6 µm while the force was maintained at 425N and the weld time increased from 1.0 to 3.0 seconds. The results are shown below in table 5.

TABLE 5

| Ex | Amplitude (µm) | Force (N) | Energy (J) | Time taken (s) | Peak Power (W) | Thickness (mm) | PWA | PWS | PT | Poly score |
|---|---|---|---|---|---|---|---|---|---|---|
| 24 | 21.6 | 425 | 665 | 1.0 | 809 | 0.500 | 60% | 10 | 10 | 280 |
| 25 | 21.6 | 425 | 1294 | 2.0 | 807 | 0.495 | 95% | 10 | 10 | 298 |
| 26 | 21.6 | 425 | 1823 | 3.0 | 838 | 0.475 | 95% | 10 | 9 | 278 |
| 27 | 21.6 | 425 | 1912 | 3.0 | 823 | 0.470 | 95% | 10 | 10 | 298 |

As can be seen, the weld produced is of excellent quality, irrespective of the time taken to form the weld.

To investigate this further, a sixth set of experiments were carried out on the same arrangement of prepreg and HDPE backing sheet, however this time the amplitude was kept at 21.6 μm while the force was gradually reduced from 400N to 325N. The results are shown below in table 6.

TABLE 6

| Ex | Amplitude (μm) | Force (N) | Energy (J) | Time taken (s) | Peak Power (W) | Thickness (mm) | PWA | PWS | PT | Poly score |
|---|---|---|---|---|---|---|---|---|---|---|
| 28 | 21.6 | 400 | 1850 | 3.0 | 766 | 0.480 | 95% | 10 | 6 | 218 |
| 29 | 21.6 | 375 | 1731 | 3.0 | 788 | 0.465 | 95% | 10 | 9 | 278 |
| 30 | 21.6 | 350 | 1770 | 3.0 | 774 | 0.495 | 95% | 10 | 10 | 298 |
| 31 | 21.6 | 325 | 1628 | 3.0 | 735 | 0.485 | 95% | 10 | 10 | 298 |

As can be seen, all of the examples produced excellent consistent results. As it represented the optimal result obtained, the details of example 31 are shown in FIG. 3*b*. It can be clearly seen that there is a first phase where there is variation in the power applied as the resin in the prepreg layer begins to warm up. This is followed by a clear second phase, where the temperature is stable and there is consistent thickness reduction of the preliminary spliced join.

Mechanical Testing

A study was completed to evaluate mechanical performance of cured laminates of spliced prepreg tapes. The splices were carried out by the known hot-press method (comparative example), ultrasonic welding of the prepreg layer only (comparative example), and simultaneous welding of the prepreg layer and polyethylene backing sheet (according to the invention).

Any overwidth generated was carefully trimmed with a knife, so that the resulting spliced prepreg tape has a constant width.

Material used for the prepreg was the resin system M21EV at 34% by weight with 268 gsm 12 k unidirectional carbon fibres (Intermediate Modulus Type A) with a width of 2″ (5.08 mm), (the individual components being available from Hexcel Composites Limited, United Kingdom)

After splicing was carried out, any backing sheets were removed and laminates for tensile test were assembled from four 300×300 mm layers of tape, with layer 2 containing a splice of 30 mm length overlap in the middle. The prepreg tapes in each layer were all parallel to each other. Layers 1, 3 and 4 were prepreg tapes having no splice. Each layer comprised six parallel strips of prepreg tape. The laminates were cured in an autoclave for 2.5 hours at 180° C. (with 1° C./min ramp rate) to form cured composite laminates.

Thus, three composite laminates were prepared, one with a layer of hot press spliced prepreg tapes (series A), one with a layer of ultrasonically welded prepreg tape (without polymeric backing sheet, series B) and one with a layer of ultrasonically welded prepreg tape (without polymeric backing sheet, series C). Each composite laminate was then cut into six strips, each strip being made up of a laminate of four layers of original prepreg tape. The tensile strength of each strip was measured according to EN2561B test method.

The results of tensile strength testing are given below in table 7.

TABLE 7

| Test ID | Width (mm) | Thickness (mm) | Tensile Strength (MPa) | Tensile Modulus (GPa) |
|---|---|---|---|---|
| A-1 | 14.48 | 1.14 | 1850.4 | 181.5 |
| A-2 | 14.91 | 1.11 | 1976.1 | 188.4 |

TABLE 7-continued

| Test ID | Width (mm) | Thickness (mm) | Tensile Strength (MPa) | Tensile Modulus (GPa) |
|---|---|---|---|---|
| A-3 | 14.88 | 1.11 | 1801.6 | 181.3 |
| A-4 | 14.88 | 1.10 | 1914.6 | 191.4 |
| A-5 | 14.88 | 1.11 | 1988.0 | 180.7 |
| A-6 | 14.84 | 1.12 | 1900.7 | 191.2 |
| B-1 | 14.91 | 1.07 | 2093.6 | 160.8 |
| B-2 | 14.89 | 1.05 | 1978.4 | 172.6 |
| B-3 | 14.89 | 1.07 | 2045.8 | 169.6 |
| B-4 | 14.86 | 1.07 | 2007.3 | 162.4 |
| B-5 | 14.87 | 1.07 | 1967.0 | 163.9 |
| B-6 | 14.88 | 1.08 | 2014.4 | 166.3 |
| C-1 | 15.05 | 1.08 | 2089.5 | 171.1 |
| C-2 | 15.03 | 1.08 | 2070.9 | 174.0 |
| C-3 | 15.01 | 1.10 | 2267.7 | 176.5 |
| C-4 | 15.01 | 1.10 | 1913.4 | 168.0 |
| C-5 | 14.94 | 1.08 | 2301.4 | 172.1 |
| C-6 | 14.95 | 1.06 | 2031.0 | 200.3 |

Tensile tests gave higher strength on samples containing US splices. Specifically using conventional splice as reference (100%), tensile strength for the samples containing tape only US splices was 106% and tensile strength for the samples according to the present invention was 111%.

A second batch of laminates for flexure testing were prepared from eight 200×150 mm layers of tape, with layer 4 containing a splice of 30 mm length in the middle. The prepreg tapes in each layer were all parallel to each other. Layers 1 to 3 and 5 to 8 were prepreg tapes having no splice. Each layer comprised three parallel strips of prepreg tape. The laminates were cured in an autoclave for 2.5 hours at 180° C. (with 1° C./min ramp rate) to form cured composite laminates.

Thus, three composite laminates were prepared, one with a layer of hot press spliced prepreg tapes (series A), one with a layer of ultrasonically welded prepreg tape (without polymeric backing sheet, series B) and one with a layer of ultrasonically welded prepreg tape (without polymeric backing sheet, series C). Each composite laminate was then cut into six strips, each strip being made up of a laminate of eight layers of original prepreg tape. The tensile strength of each strip was measured according to EN2562 test method.

The results of tensile strength testing are given below in table 8.

TABLE 8

| Test ID | Width (mm) | Thickness (mm) | Flexural Strength (MPa) | Flexural Modulus (GPa) |
|---|---|---|---|---|
| A-1 | 10.07 | — | 1728.0 | 174.7 |
| A-2 | 10.04 | — | 1898.0 | 170.8 |
| A-3 | 10.00 | — | 1827.9 | 171.4 |
| A-4 | 10.01 | — | 1679.6 | 173.2 |
| A-5 | 10.01 | — | 1808.4 | 176.6 |
| A-6 | 10.03 | — | 1794.2 | 177.3 |
| B-1 | 10.02 | 2.096 | 1551.0 | 162.1 |
| B-2 | 10.02 | 2.106 | 1623.9 | 158.0 |
| B-3 | 10.03 | 2.098 | 1600.9 | 163.3 |
| B-4 | 10.02 | 2.092 | 1596.6 | 163.6 |
| B-5 | 9.99 | 2.123 | 1611.4 | 158.4 |
| B-6 | 10.02 | 2.124 | 1691.8 | 160.8 |
| C-1 | 10.04 | 2.115 | 1801.0 | 164.8 |
| C-2 | 10.05 | 2.104 | 1737.8 | 166.3 |
| C-3 | 10.05 | 2.108 | 1682.7 | 165.9 |
| C-4 | 10.04 | 2.098 | 1695.5 | 164.3 |
| C-5 | 10.04 | 2.123 | 1644.4 | 160.7 |
| C-6 | 10.04 | 2.137 | 1649.6 | 165.4 |

Flexure tests gave lower strength on samples containing ultrasonic splices. Lower Flex strength is considered advantageous as it demonstrates less distortion of the laminate. The thicknesses of the hot press splices were not of interest because they were approximately double the thickness of the ultrasonically welded splices, and so therefore far inferior.

The invention claimed is:

1. A process for forming a spliced prepreg tape by joining adjacent ends of a first and a second prepreg tape, each prepreg tape comprising a respective first and second prepreg layer comprising fibrous material and curable thermosetting resin, each prepreg tape further comprising a respective first and second releasable polymeric backing sheet, the process comprising:

peeling of the first polymeric backing sheet from the first prepreg layer, so as to provide a first peeled end region, and optionally peeling of the second polymeric backing sheet from the second prepreg layer, so as to provide a first peeled end region, and optionally a second peeled end region, over which peeled end region or regions the prepreg layer is separated from its respective polymeric backing sheet;

overlapping the first and second prepreg tapes at the first peeled end region, and, if present, the second peeled end region, so as to form a preliminary spliced join, the preliminary spliced join comprising first and second adjacent layers of prepreg and first and second adjacent layers of polymeric backing sheet; and ultrasonically welding of the preliminary spliced join to merge together the first and second adjacent layers of prepreg and to merge together the two adjacent layers of polymeric backing sheet to form the spliced prepreg tape.

2. The process according to claim 1, wherein the polymeric backing sheet is high density polyethylene.

3. The process according to claim 1, wherein a thickness of a spliced join is from 50 to 95% of a thickness of the preliminary spliced join, preferably from 70 to 90%.

4. The process according to claim 1, wherein the length of the preliminary spliced join is from 3 to 200 mm, more preferably from 10 to 150 mm, and most preferably from 15 to 75 mm.

5. The process according to claim 1, wherein the first and second prepreg tapes have the same width.

6. The process according to claim 1, wherein the first and second prepreg tapes have the same thickness.

7. The process according to claim 1, wherein a width of the first and second prepreg tapes is less than 30 cm, preferably less than 20 cm, more preferably less than 10 cm.

8. The process according to claim 1, wherein the ultrasonic welding causes the prepreg layer to spread laterally to create an overwidth extending beyond the backing sheet, followed by a step of cutting away the overwidth after forming the spliced join.

9. The process according to claim 1, wherein the ends of the prepreg tapes are straight ends.

10. The process according to claim 1, wherein the steps of peeling, overlapping and ultrasonically welding are carried out automatically without the need for manual intervention.

11. The process according to claim 10, wherein the automation involves the use of suction applied to the prepreg tape to induce the peeling, and preferably also the overlapping.

12. The process according to claim 1, wherein only the first backing sheet is peeled away to form a first peeled end region, into which peeled end region is inserted the end of the second prepreg tape, such that the preliminary spliced join comprises: the first polymeric backing sheet, which is adjacent to the second polymeric backing sheet, which is adjacent to the second prepreg layer, which is adjacent to the first prepreg layer.

13. The process according to claim 1, wherein the first backing sheet and the second backing sheet are peeled away to form a first peeled end region and a second peeled end region, the first peeled end region and second peeled end region being mutually inserted into each other, such that the preliminary spliced join comprises: the first polymeric backing sheet, which is adjacent to the second polymeric backing sheet, which is adjacent to the first prepreg layer, which is adjacent to the second prepreg layer.

14. The process according to claim 1, preceded by a prepreg tape manufacturing step, wherein the first and second prepreg tapes are manufactured by bringing together a layer of fibrous material with at least one layer of curable thermosetting resin, impregnating the thermosetting resin so that it enters the interstices between the fibres, thereby to produce the first and second prepreg tapes without slitting a master prepreg tape by slitting along its length.

15. The process according to claim 14, wherein the resulting first and/or second prepreg tape is cut along its width, on either side of a defect in the produced tape, prior to the subsequent splicing step.

16. The process according to claim 14, wherein the manufacturing step and the subsequent splicing step are part of a single continuous prepreg tape manufacturing process.

* * * * *